US008285957B1

United States Patent
Nag, Yasa et al.

(10) Patent No.: US 8,285,957 B1
(45) Date of Patent: Oct. 9, 2012

(54) SYSTEM AND METHOD FOR PREPROCESSING A DATA SET TO IMPROVE DEDUPLICATION

(75) Inventors: Giridhar Appaji Nag, Yasa, Bangalore (IN); Roger Keith Stager, Livermore, CA (US)

(73) Assignee: NetApp, Inc., Sunnyvale, CA (US)

( * ) Notice: Subject to any disclaimer, the term of this patent is extended or adjusted under 35 U.S.C. 154(b) by 281 days.

(21) Appl. No.: 12/686,297

(22) Filed: Jan. 12, 2010

(51) Int. Cl.
*G06F 12/16* (2006.01)
*G06F 7/04* (2006.01)
(52) U.S. Cl. ......... 711/162; 711/154; 707/693; 707/698
(58) Field of Classification Search .................. None
See application file for complete search history.

(56) References Cited

U.S. PATENT DOCUMENTS

| | | | |
|---|---|---|---|
| 7,478,113 B1* | 1/2009 | De Spiegeleer et al. | 1/1 |
| 2005/0091234 A1* | 4/2005 | Hsu et al. | 707/100 |
| 2005/0283610 A1* | 12/2005 | Serret-Avila et al. | 713/176 |
| 2008/0256143 A1* | 10/2008 | Reddy et al. | 707/204 |
| 2008/0301134 A1* | 12/2008 | Miller et al. | 707/6 |
| 2009/0070367 A1* | 3/2009 | Xu et al. | 707/102 |
| 2009/0307251 A1* | 12/2009 | Heller et al. | 707/101 |
| 2010/0057750 A1* | 3/2010 | Aasted et al. | 707/10 |
| 2010/0180075 A1* | 7/2010 | McCloskey et al. | 711/112 |
| 2011/0040763 A1* | 2/2011 | Lillibridge et al. | 707/737 |
| 2011/0238914 A1* | 9/2011 | Hirayama | 711/118 |

* cited by examiner

*Primary Examiner* — Kaushikkumar Patel
(74) *Attorney, Agent, or Firm* — Perkins Coie LLP (57) ABSTRACT

The technique introduced here includes a system and method for preprocessing a data set to improve deduplication, and more specifically for reducing latency. The technique illustratively utilizes one or more preprocessing steps, including a "skipping" step and a "folding" step, which can be applied to a data set prior to deduplication to reduce the time consumed by deduplication. The folding step is applied to segments of the data set to reduce the length of the segments. The skipping step can be applied to the data set prior to the folding step to remove particular segments of the data set, to further improve deduplication performance in certain circumstances. The overall effect of the skipping and folding steps of this technique is to produce a data set of reduced total length for consideration in identifying duplicate data, which aids in reducing the time required for deduplication.

52 Claims, 6 Drawing Sheets

SYSTEM AND METHOD FOR PREPROCESSING A DATA SET TO IMPROVE DEDUPLICATION

FIELD OF THE INVENTION

At least one embodiment of the present invention relates generally to data storage systems and, more specifically, to preprocessing a data set to reduce the amount of time required to deduplicate the data set.

BACKGROUND OF THE INVENTION

A network storage server is a processing system that is used to store and retrieve data on behalf of one or more hosts on a network. A storage server operates on behalf of one or more hosts to store and manage data in a set of mass storage devices, such as magnetic or optical storage-based disks or tapes. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp, Inc. of Sunnyvale, Calif.

One common use of storage servers is data mirroring. Mirroring is a technique for backing up data, where a given data set at a source is replicated exactly at a destination, which is often geographically remote from the source. The replica data set created at the destination is called a "mirror" of the original data set. Note that in a large-scale storage system, such as an enterprise storage network, it is common for large amounts of data, such as certain data blocks, to be duplicated and stored in multiple places in the storage system. Sometimes this duplication is intentional, as in the case of mirroring, but often it is an incidental result of normal operation of the system. Such incidental data duplication generally is not desirable from the standpoint that storage of the same data in multiple places consumes extra storage space, which is a limited resource.

One form of long term archival storage is the storage of data on magnetic tape media. A noted disadvantage of magnetic tape media is the slow data access rate and the added requirements for managing a large number of physical tapes. In response to these noted disadvantages of magnetic tape media, several storage system vendors provide virtual tape library (VTL) systems, in the form of network storage servers, that emulate tape storage devices using, for example, disk drives. In typical VTL environments, the storage system performs a complete backup operation, i.e. a mirror, of the storage system's file system (or other data store) to the VTL system. Multiple complete backups of such a data set may occur over time thereby resulting in undesirable duplicate data and inefficient utilization of storage space on the VTL system.

Consequently, in many large-scale storage systems, storage servers have the ability to "deduplicate" data, which is the ability to identify and remove duplicate data in a data set. Many deduplication techniques involve identifying anchors within the data set to be deduplicated. As used herein, an "anchor" is a location within a data set in a region of interest for potential data de-duplication. Some techniques utilize a rolling hash to identify anchors within the data set. Typically, such techniques are computationally expensive and thus contribute latency to the deduplication process. Latency in the deduplication process has negative consequences including, for example, difficulty in or an outright inability to perform deduplication on particularly large data sets.

These negative consequences arise when, for example, a data set is being received over a network by a storage server. In one case, the data set is too large to fit on the storage server prior to deduplication, but small enough to fit on the storage server after deduplication. In such a case, the storage server cannot store the too-large data set locally for the purpose of deduplicating it. Instead, the storage server must deduplicate the data set "live," i.e., during ingest of the data set at a rate determined by the network's bandwidth, so that only the non-duplicate portion of the data set is actually stored at the storage server. However, as stated above, deduplication techniques are computationally expensive. Thus, the computational resources of the storage server typically cannot deduplicate the data set being received at the network rate. In the worst case, this leads to a failed backup operation. One possible way to deal with this negative consequence is to reduce the sender's data rate, but this leads to network underutilization and an increase in the total amount of time required for backing up the data set.

SUMMARY

The technique introduced here includes a system and method for preprocessing a data set to improve deduplication, and more specifically for reducing latency in the deduplication process. The technique illustratively utilizes one or more preprocessing steps, including a "skipping" step and a "folding" step, which can be applied to a data set prior to deduplication to reduce the time consumed by deduplication. In particular, the folding step is applied to segments of the data set to reduce the length of the segments. An illustrative folding step includes performing a logical operation on a group of bytes to produce a corresponding smaller number of bytes. The skipping step can be applied to the data set prior to the folding step to remove particular segments of the data set, to further improve deduplication performance in certain circumstances. An illustrative skipping step includes excluding some number of bytes from any group of bytes subsequently folded. The overall effect of the skipping and folding steps of this technique is to produce a data set of reduced total length for consideration in identifying duplicate data, which aids in reducing the overall time required for deduplication.

BRIEF DESCRIPTION OF THE DRAWINGS

The above and further advantages of the technique introduced here may be better understood by referring to the following description in conjunction with the accompanying drawings in which like reference numerals indicate identical or functionally similar elements.

DETAILED DESCRIPTION

A method and system for preprocessing a data set to improve deduplication, and more specifically for reducing latency in the deduplication process are described. Note that references in this specification to "an embodiment," "one embodiment," or the like mean that the particular feature, structure, or characteristic being described is included in at least one embodiment of the present invention. Occurrences of such phrases in this specification do not necessarily all refer to the same embodiment.

A. Storage System Environment

Figure 1:
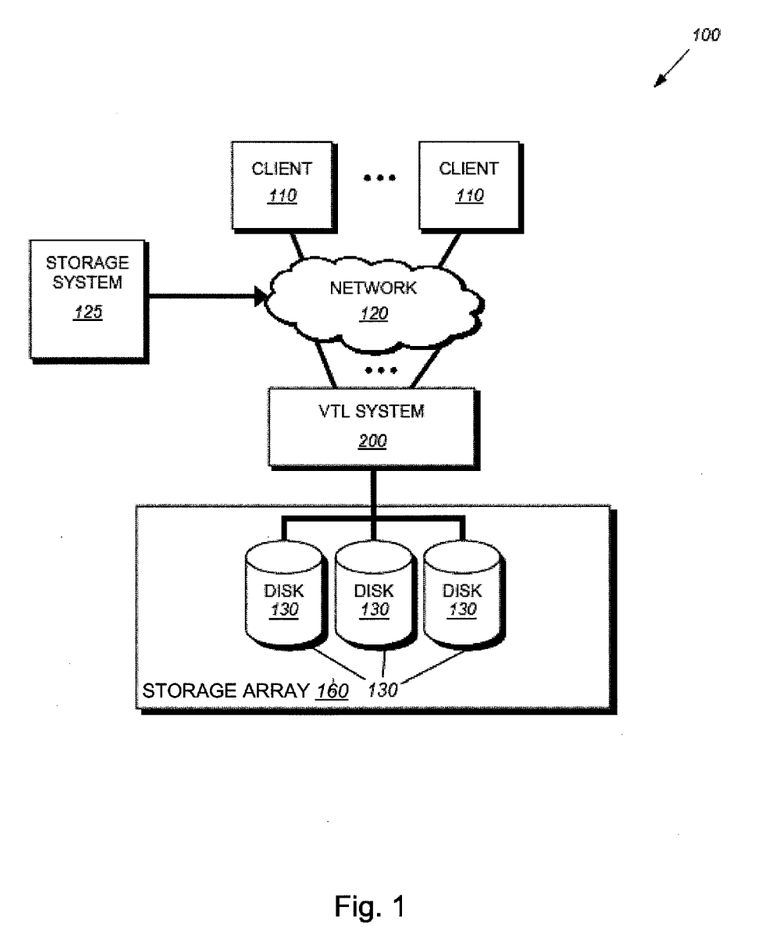
FIG. 1 is a block diagram of a storage system environment, including a virtual tape library (VTL) system, which can include an embodiment of the present invention.

FIG. 1 is a block diagram of storage system environment 100 in which the technique introduced here can be implemented. Storage system environment 100 includes storage system 125 interconnected with multiple clients 110 by network 120. Illustratively, network 120 can be embodied as an Ethernet network or a Fibre Channel network. Also interconnected with network 120 is VTL system 200 that can implement the technique introduced here. VTL system 200 is operatively connected with one or more storage devices, such as disks 130, organized as storage array 160. In one embodiment, VTL system 200 is a storage server. In another embodiment, VTL system 200 and storage array 160 together form a storage server. In one embodiment, storage array 160 is a mass storage facility.

In operation, storage system 125 services data access requests from clients 110. Each client 110 can be a general-purpose computer configured to execute applications and interact with storage system 125 in accordance with, for example, a client/server model of information delivery. That is, one of clients 110 can request the services of storage system 125, which can return the results of the services requested by the client, by exchanging packets over network 120. Clients 110 can issue packets including file-based access protocols, such as the Common Internet File System (CIFS) protocol or Network File System (NFS) protocol, over TCP/IP when accessing information, such as data, in the form of data containers such as files and directories. Alternatively, clients 110 can issue packets including block-based access protocols, such as the Small Computer Systems Interface (SCSI) protocol encapsulated over TCP (iSCSI) and SCSI encapsulated over Fibre Channel (FCP), when accessing information in the form of data containers such as blocks.

To perform a backup operation of storage system 125, conventional tape backup software can be utilized with storage system 125 to perform a backup operation to VTL system 200. In one embodiment, VTL system 200 appears to storage system 125 as a remote tape drive; thus, storage system 125 can perform a conventional tape backup operation to VTL system 200 using conventional tape backup software. In certain embodiments, each backup operation results in copying of an entire file system stored by storage system 125 to VTL system 200, e.g., as a "backup." As used herein, a file system is a structured (e.g. hierarchical) set of stored files, directories, and/or other type(s) of data containers. A noted result of such copying is that VTL system 200 can receive substantial amounts of duplicate data, i.e., data that is common among two or more of the backups of storage system 125, or redundant data between backups of different clients 110, or a combination of both. In accordance with an illustrative embodiment of the present invention, VTL module 260 (of FIG. 2) operates to deduplicate data written to VTL system 200 using "skipping" and "folding" preprocessing steps as well as deduplicating steps.

It should be noted that storage system environment 100 is merely illustrative, and that the techniques introduced herein can be advantageously utilized in other storage system environments, such as storage system environments lacking a VTL system. For example, in alternate embodiments, the techniques introduced herein can be utilized in a data transfer or backup operation between two of clients 110, or between one of client 110 and storage system 125.

B. Virtual Tape Library System

Figure 2:
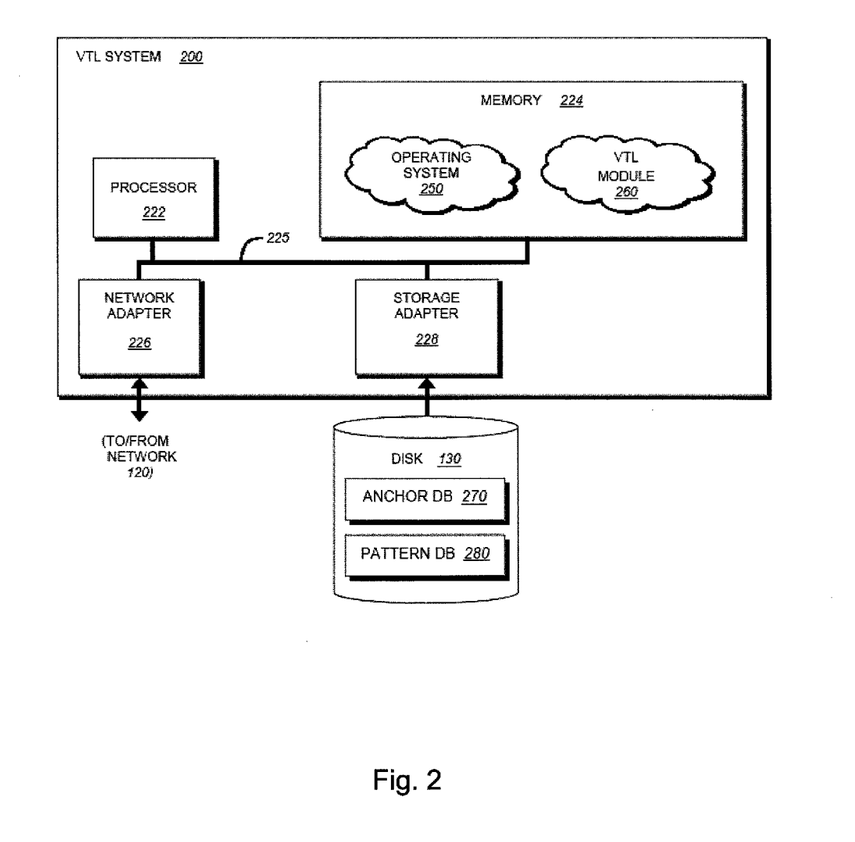
FIG. 2 is a block diagram of an example of a VTL system.

FIG. 2 is a block diagram of VTL system 200 that can be advantageously used with an embodiment of the present invention. As stated above, in one embodiment VTL system 200 is a storage server. Illustratively, VTL system 200 is a computer that provides storage service relating to the organization of information on storage devices, such as disks 130 of storage array 160. VTL system 200 illustratively includes processor 222, memory 224, one or more network adapters 226 and one or more storage adapters 228 interconnected by system bus 225. Each network adapter 226 includes the mechanical, electrical, and signaling circuitry needed to connect VTL system 200 to storage system 125 over network 120. VTL system 200 also includes operating system 250 that interacts with various modules, such as VTL module 260, described further below. Operating system 250 can implement a logical data object store on disks 130 for use by applications, such as VTL module 260 executing on VTL system 200. As described herein, the logical data object store is illustratively embodied as anchor database 270 and pattern database 280. Anchor database 270 illustratively stores anchors for use in deduplication operations, while pattern database 280 stores data for use in deduplication operations. As stated previously, an anchor is a location within a data set in a region of interest for potential data de-duplication.

In an illustrative embodiment, memory 224 includes storage locations that are addressable by processor 222 and adapters 226 and 228 for storing software program code such as operating system 250 and VTL module 260, and related data structures. Memory 224 can additionally store other information as required for the performance of the techniques introduced here. Processor 222 and adapters 226 and 228 can, in turn, include one or both of processing elements and logic circuitry configured to execute the software code and manipulate the data structures. It will be apparent to those skilled in the art that other forms of processing and memory devices, including various hardware, software, and computer readable media can be used for storing and executing program instructions, or otherwise performing processes, pertaining to the techniques described herein.

Storage adapter 228 cooperates with operating system 250 executing on VTL system 200 to store and retrieve information requested on any type of attached array of storage device media such as, for example, video tape, optical, DVD, magnetic tape, bubble memory, electronic random access memory, micro-electro mechanical, and any other media adapted to store information, including data and parity information. As illustratively described herein, the information can be stored on disks 130, such as hard disk drives (HDD) or direct access storage devices (DASD), of storage array 160. Storage adapter 228 includes input/output (I/O) interface circuitry that couples to disks 130 over an I/O interconnect arrangement, such as a conventional high-performance Fibre Channel serial link topology.

As noted, operating system 250 illustratively implements a logical data object store on disks 130. It should be also noted that in alternate embodiments, other forms of data organization on disks 130 can be utilized including, for example, a file system. As such, the description of utilizing a data object store should be taken as illustrative only. Furthermore, VTL module 260 cooperates with operating system 250 to implement virtual tape library functionality for VTL system 200. Illustratively, VTL module 260 stores data using the data object store. Notably, VTL module 260 also implements the data deduplication technique, including skipping and folding preprocessing steps, of the techniques described here. Further, VTL module 260 illustratively implements a technique to enable anchor detection, as described further below.

C. Data Deduplication with Skipping and Folding Preprocessing

Figure 3:
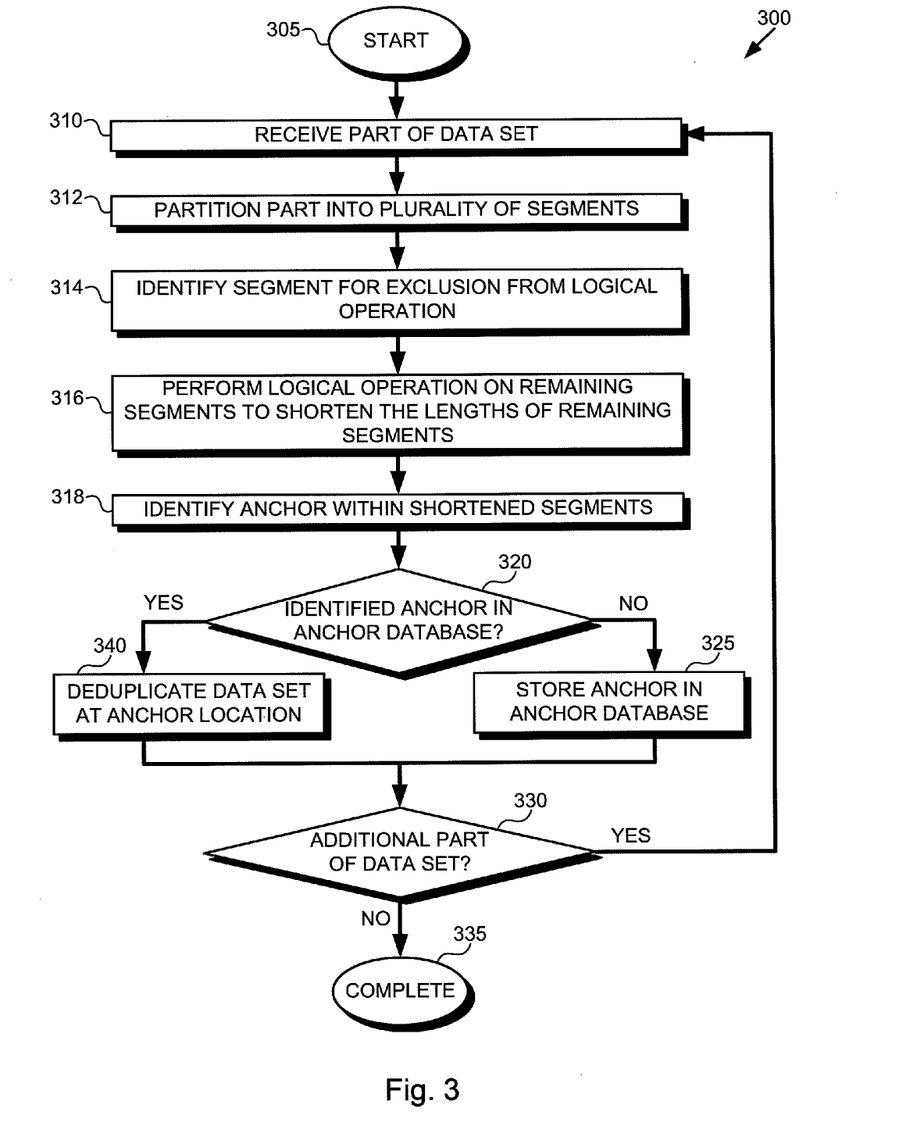
FIG. 3 is a flowchart of an example of a data deduplication process with data segment skipping and folding.

FIG. 3 is a flowchart of an example of data deduplication process 300 with data segment skipping and folding. Process 300 begins in step 305 and continues to step 310, in which a part of a data set is received by a server, such as VTL system 200. The data set can be a tape backup data stream directed to VTL system 200 from storage system 125. In alternate embodiments, the data set can include any data stored on any computer including, for example, a file stored within storage system 125. As such, the description of the data set as being a tape backup stream is to be taken as illustrative only, and the teachings of the technique introduced here can be utilized in environments different from the described VTL system environment. As discussed above, the data set can contain duplicate data, which will be advantageously deduplicated according to the technique introduced here. Notably, in process 300, step 312, step 314, and step 316 can be regarded as skipping and folding preprocessing steps, as discussed in detail below.

After receiving the part of the data set, VTL module 260 partitions the part into a group of segments in step 312 (e.g., identifies a group of segments in the part of the data set). Each segment of the group of segments can be, for example, one byte long (as is known in the art, a byte includes eight bits, but in various embodiments bytes can be defined to have different amounts of bits). VTL module 260 can identify each segment based on, for example, its length. In this discussion, references to the lengths of segments, data sets, or other information generally refer to their respective sizes in, for example, bits. Notably, in some embodiments VTL module 260 can begin partitioning a first part of the data set in step 312 while receiving a second part of the data set in step 310. Thus, in some embodiments the steps of process 300 can operate concurrently, or in parallel, on different parts of a data set.

After partitioning the part of the data set in step 312, in step 314 VTL module 260 identifies at least one segment in the group of segments for exclusion from a subsequent logical operation in step 316. Step 314 can thus be regarded as a data segment "skipping" step, in which at least one segment from the partitioned part of the data set is skipped, i.e., identified for exclusion from processing in steps following step 314. Step 314 can also be regarded as generating an output data set that includes at least one of, but not all of, the group of segments of the partitioned part of the data set. In one embodiment, the amount of segments identified to be skipped can be a fixed number. In another embodiment, the amount of segments identified to be skipped can be a number of segments, where the number does not exceed a specified value. The number can be selected nonrandomly, e.g. according to a fixed pattern or according to a nonrandom algorithm, or the number can be selected randomly. For example, in an illustrative embodiment in which the specified value is equal to three, then in step 314 zero, one, two, or three bytes in the group can be identified for exclusion from subsequent processing.

After identifying at least one segment for exclusion in step 314, in step 316 VTL module 260 performs a logical operation on the remaining segments (i.e., the segments in the group of segments that were not excluded) to shorten the length of the remaining segments. Step 316 can thus be regarded as a data segment "folding" step, wherein several segments from the partitioned part of the data set are "folded" into each other, i.e., are logically operated upon to reduce their length. In one embodiment, the logical operation is performed on every segment in the group of segments except that segment (or those segments) identified for exclusion in prior step 312. The logical operation can be performed on, for example, groups of several segments (e.g., groups of four segments) to reduce the length of each group of segments to equal the length of only one segment (i.e., "four-to-one folding"). Thus, in an embodiment where a segment is one byte, the logical operation can be performed on groups of four bytes to fold the bytes into one byte.

The logical operation of step 316 can be one or a combination of several logical operations according to the technique introduced here. In some embodiments the logical operation includes a lossless logical operation, i.e., a logical operation which does not result in a loss of information. In other embodiments the logical operation includes a lossy logical operation, i.e., a logical operation which does result in a loss of information. In one embodiment, the logical operation is configured to remove a subsegment of a segment being operated upon. In one embodiment, the logical operation is configured to combine multiple subsegments of a segment being operated upon. For example, in one embodiment the logical operation is a lossy "XOR" (exclusive or) logical operation that folds four bytes into one byte.

In step 318, an anchor is identified within the shortened, remaining segments provided from prior steps. Illustratively, an anchor can be identified by the use of a rolling hash implementation. A rolling hash implementation can maintain an instant hash (i.e., can maintain some manner of digest, or state information) about a certain amount of data previously received by the implementation (i.e., maintain an instant hash about data in a "history window" of the implementation). When new data is provided to the rolling hash implementation, the new data is appended to the beginning of the history window, and (if the history window is full) the oldest data is removed from the end of the history window. Then, the rolling hash implementation updates the instant hash to reflect the new data and to remove the effect of the oldest data, which was removed. In this manner, the rolling hash implementation incorporates new data in its maintained state and "forgets" old data. When used with a data set larger than the history window, the rolling hash implementation provides a manageable way to maintain state about "recent" data provided from a data set.

When new data is provided to a rolling hash implementation, the updated instant hash is examined to determine whether the location of the new data in the data set is an anchor for subsequent deduplication purposes. In one embodiment, the examination of the instant hash entails logically operating on the instant hash and a fixed mask value to produce a result, and then checking that the result is equal to the fixed mask value used in the logical operation. For example, the logical operation can include XORing the instant hash and the fixed mask value. If the result is equal to the fixed mask value, then an anchor is identified at the location of the new data. The fixed mask value can be selected to, for example, ensure that sets of anchors identified in a data set have a probable inter-anchor distance. Thus, in step 318, an anchor is identified within the shortened, remaining segments provided from prior steps by, in one embodiment, providing a rolling hash implementation with the shortened, remaining segments and examining the updated instant hash to identify an anchor.

When an anchor is identified in step 318, in step 320 VTL module 260 determines whether the identified anchor is already stored in anchor database 270 in storage array 160, by, for example, searching anchor database 270 for the value of the instant hash utilized to identify the anchor in the shortened, remaining segments. If the identified anchor is not stored in anchor database 270, VTL module 260 will not attempt deduplication at the location of the anchor in the data set, and process 300 branches to step 325 in which VTL module 260 stores the identified anchor in anchor database 270. Certain anchors will not be stored in anchor database 270, e.g., anchors that occur too frequently to be of use. VTL module 260 can be configured to detect these frequently occurring anchors or can, in alternate embodiments, track frequently occurring anchors to identify those that should not be maintained. Following step 325, in step 330 a determination is made whether an additional part of the data set is available for deduplication. If so, process 300 loops back to step 310. Otherwise, process 300 completes in step 335.

However, if the anchor identified in step 318 is already stored in anchor database 270 (e.g., if anchor database 270 has previously stored an anchor referenced by the value of the instant hash), then process 300 branches to step 340. In step 340 VTL module 260 deduplicates the data set at a location determined by the location of the anchor in the shortened, remaining segments. This determination involves, for example, mapping the location of the anchor in the shortened, remaining segments back into the data set. For example, an anchor located between two folded bytes can be mapped back into the corresponding location between two groups of unfolded bytes, i.e., back into the data set as it appeared prior to skipping and folding. After such mapping, in one embodiment VTL module 260 begins comparing the region in the data set surrounding the mapped anchor with regions in pattern database 280 to identify forward and backward delta values in the data set. The delta values identify the number of consecutive bits forward and backward from the mapped anchor in the data set that are identical to a region in pattern database 280. By utilizing the mapped anchor along with forward and backward deltas, a region of duplicate data can be identified. This identified region of duplicate data can be eliminated from storage in disks 130 by VTL system 200, thereby achieving compression and improving the efficiency of the use of storage resources.

To complete step 340 and eliminate the identified region of duplicate data from storage, the identified region can be replaced with a storage indicator. Illustratively, the storage indicator identifies the anchor location in the data set as well as the forward and backward deltas. Compression of the data set is obtained when the storage indicator is of a smaller size then the duplicate data being replaced. Thus, depending upon implementation details, a minimum size identified region can be required before duplicate data is replaced. Again, if there are no additional parts in the data set as determined in step 330, the procedure completes in step 335.

During step 340, the region of duplicate data in the data set being processed can have additional anchors not yet identified in step 318. For example, a region in the data set encompassed by the forward and backward deltas can be wider than the region of the part of the data set so far partitioned by step 312 and subsequently processed. Thus, those additional anchors, if deduplicated, in some circumstances will not be identified. Instead, the next anchor to be identified and processed will be in a region of the data set beyond, or after, the identified region of duplicate data. In some embodiments, this results in a performance benefit, because relatively fewer anchors will have to be identified and processed when processing long streams of matching data.

D. The Efficacy of Skipping and Folding Preprocessing

Thus, as discussed above in relation to step 312, step 314, and step 316, the received part of the data set is preprocessed by skipping and folding according to the invention. Notably, the skipping and folding preprocessing steps have worked in tandem to solve the problem of latency in the deduplication process. That problem solution relates to the length of the data set: the overall length of the remaining, shortened segments can be significantly shorter than the length of the data set. This is the case because at least one segment is "skipped," or excluded from subsequent processing. Also, this is the case also because in at least one embodiment each segment is "folded," or logically operated upon to produce a segment having a shorter length. In the illustrative case of four-to-one folding described above, the data set is reduced in length by over a factor of four. Because calculating anchors (e.g. during steps 318 et seq.) is typically computationally expensive, the reduced length of the remaining, shortened segments allows the data set to be deduplicated much faster.

An issue addressed by the technique introduced here relates to the efficacy of performing the skipping step prior to the folding step during preprocessing. This issue can be illustrated by omitting the skipping step during preprocessing. By omitting the skipping step, a hindrance to the entire process becomes apparent in some circumstance: if the data set is folded (e.g., four-to-one folded as described above) without initial skipping, then the following anchor generation steps (e.g. steps 318 et seq.) may subsequently exhibit poor performance. This issue arises when a rolling hash is used to detect anchors, for example. This poor performance can occur because folding, by itself, can greatly magnify the deleterious effect of minor insertions or deletions between two data sets being compared for deduplication.

For example, consider illustrative data set A, a one gigabyte stream of bytes, and data set B, an identical one gigabyte stream of bytes. If B is compared to A for deduplication using an anchor generating deduplicator (e.g. steps 318 et seq.), without skipping and folding preprocessing (e.g. without step 312, step 314, and step 316), then nearly complete deduplication will be achieved (i.e. only about one gigabyte in total will be stored, plus overhead). This process will be slow, for reasons stated above. Then, consider inserting a single byte to the front of B, to create B'. If B' is compared to A for deduplication using the same deduplicator, without skipping and folding preprocessing, then nearly complete deduplication should again be achieved. This is so because the effect of the inserted single byte in B' will be forgotten by the deduplicator after the deduplicator makes some progress into its processing of B' (because, for example, the inserted single byte will be removed from the deduplicator's history window).

However, consider again comparing B' to A for deduplication, except with folding preprocessing, and without skipping preprocessing (e.g. with step 312 and step 316, and without step 314). Thus, the deduplicator will compare a folded version B' to a folded version of A. In this case, it is likely that no deduplication will be achieved at all. This is so because the effect of the inserted single byte in B' will not be forgotten by the deduplicator after the deduplicator makes some progress into its processing of B'. This result occurs because folding the inserted single byte into the following three bytes (e.g. in the case of four-to-one folding) of B' has the effect of spreading the effect of the single byte insertion across the entire length of B'.

Utilizing skipping preprocessing in addition to folding preprocessing prior to using an anchor generating deduplicator (e.g. utilizing the entire process 300) ameliorates this hindrance. This is the case because during a comparison of B' to A, for example, the effect of the inserted single byte in B' will be eliminated if that byte is skipped (i.e. if that byte is identified during step 314 for exclusion from subsequent logical operation) and is therefore not folded into any following bytes. If the inserted single byte is not folded into any following bytes, then the effect of its insertion will not be spread across the entire length of B'. Consequently, nearly complete deduplication can be achieved (e.g. only about one gigabyte in total will be stored, plus overhead). Significantly, this process will be much faster than the comparison of B' of A performed without skipping and folding preprocessing, because of the length reduction explained above.

E. Additional Embodiments

Figure 4:
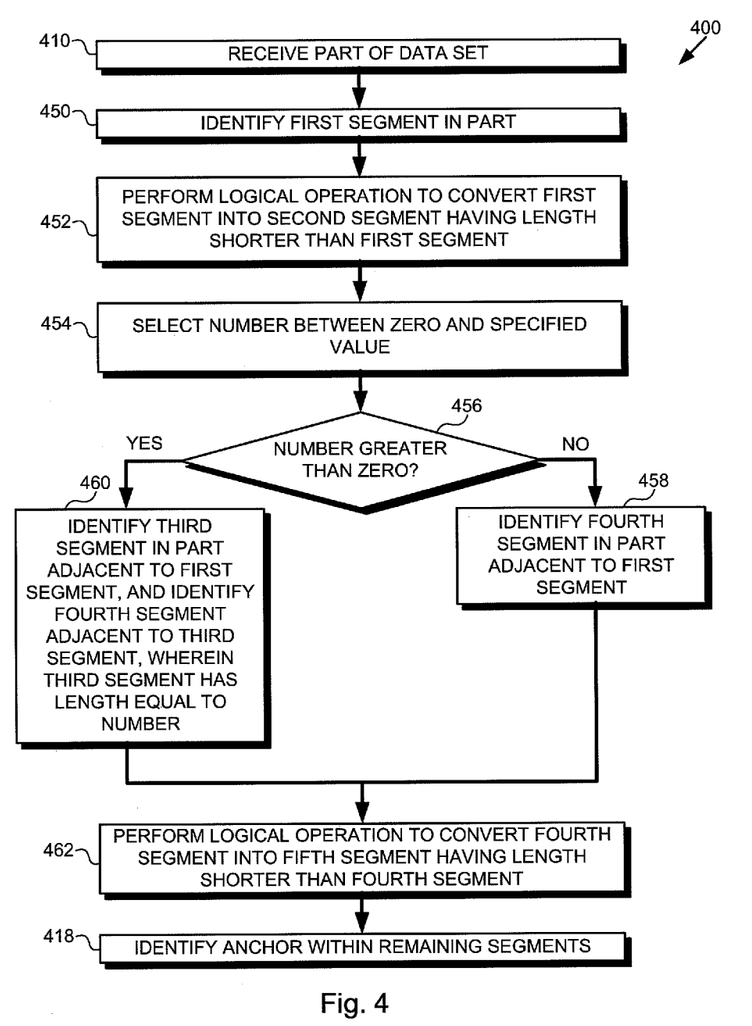
FIG. 4 is a flowchart of an example of a portion of a data deduplication process with data segment skipping and folding according to an alternate embodiment.

FIG. 4 is a flowchart of an example of a portion of a data deduplication process 400 with data segment skipping and folding according to an alternative illustrative embodiment of the present invention. Process 400 begins with step 410 and ends with step 418. The steps depicted in process 400 between step 410 and step 418 represent alternatives to step 312, step 314, and step 316 in process 300. Step 418 in process 400 can be followed by steps substantially similar to those following step 318 in process 300 (i.e. similar to step 320 et seq.).

Process 400 begins in step 410 where a part of a data set is received by a server such as VTL system 200. After receiving the part of the data set, VTL module 260 identifies a first segment in the part in step 450. The first segment can include, for example, four contiguous bytes in the part.

It should be noted that references herein to the first segment as a "first" segment are made for descriptive convenience. The adjective "first" is not used to convey a particular ordering or primacy of the first segment. Similarly, in the discussion to follow, references will be made to a "second" segment, a "third" segment, and so on. Those adjectives "second" and "third" are also not meant to convey a particular ordering or importance of their associated segments.

After identifying the first segment in step 450, in step 452 VTL module 260 performs a logical operation on the first segment to shorten the length of the first segment to create a second segment. Step 452 can thus be regarded as a segment "folding" step, wherein a first segment from the part of the data set is folded into a second segment having reduced length. Illustratively, in an embodiment where the first segment has four bytes, the logical operation can be performed on the first segment to yield a second segment having one byte. The logical operation of step 452 can be one or a combination of several logical operations according to the technique introduced here. In some embodiments, the logical operation includes a lossless logical operation, and in other embodiments the logical operation includes a lossy logical operation. In one embodiment, the logical operation is configured to remove a subsegment of the first segment. In one embodiment, the logical operation is configured to combine multiple subsegments of the first segment. For example, in one embodiment the logical operation is an "XOR" (exclusive or) logical operation that folds four bytes into one byte.

After folding the first segment in step 452, in step 454 VTL module 260 selects a number in the range of zero to a specified value inclusive (i.e. selects zero, or selects a number between zero and the specified value, or selects the specified value). In one embodiment, the number is selected randomly, e.g. with a random number generator of VTL system 200. In another embodiment, the number is selected nonrandomly. In one embodiment, the specified value is chosen to be smaller than the length of the first segment. For illustration, in an embodiment where the first segment has a length of four bytes, then the specified value can be chosen to equal three. After selecting the number in step 454, in step 456 process 400 branches depending on the value of the number. If the number is not greater than zero (i.e., if the number is equal to zero) then process 400 branches to step 458. However, if the number is greater than zero, then process 400 branches to step 460.

If process 400 branches to step 460, then in step 456 process 400 determined that the number is not zero. Consequently, in step 460 VTL module 260 identifies a third segment in the part of the data set that is adjacent to the first segment and that has a length equal to the number. For example, if the number is three, then VTL module 260 identifies a third segment having a length of three bytes, adjacent to the first segment which illustratively has a length of four bytes. Further, in step 460 VTL module 260 also identifies a fourth segment adjacent in the part of the data set to the third segment. In one embodiment, the fourth segment follows the third segment, and the first segment precedes the third segment. The fourth segment illustratively has a length equal to the length of the first segment, e.g. four bytes.

In contrast, if process 400 branches to step 458, then in step 456 process 400 determined that the number is zero. Consequently, in step 458 VTL module 260 does not identify a third segment. Instead, VTL module 260 identifies only a fourth segment adjacent in the part of the data set to the first segment. The fourth segment illustratively has a length equal to the length of the first segment.

After either step 460 or step 458, process 400 has identified a fourth segment, and proceeds to step 462. In step 462, VTL module 260 performs a logical operation on the fourth segment to shorten the length of the fourth segment to create a fifth segment. Illustratively, then, step 462 can thus be regarded as a segment "folding" step in much the same fashion as step 452. Illustratively, in an embodiment where the fourth segment has four bytes, the logical operation can be performed on the fourth segment to yield a fifth segment having one byte. In one embodiment the logical operation is an "XOR" (exclusive or) logical operation.

It should be observed that step 460 can be regarded as a data segment "skipping" step, wherein the third segment identified in the data set is skipped, or is excluded from processing in steps following step 460. Notably, in some cases, when step 458 is performed instead of step 460, no skipping of a third segment occurs in process 400. For example, in one embodiment, if process 400 performs step 458, the fourth segment identified in step 458 occupies a region of the part of the data set which would have been at least partially occupied by the third segment, had process 400 instead performed step 460. Further, in such a case, the region occupied by the fourth segment is folded in step 462, whereas in a separate case the same region if occupied by the third segment would not have been folded. Thus, the determination made in step 456 leads to a conditional skipping of a third segment, depending on the value of the number selected in step 454.

After step 462, the first and fourth segments have thus been folded according to the technique introduced here into the second and fifth segments, respectively. Further, a third segment has been conditionally skipped, depending on the branching determined in step 456. The second and fifth segments are utilized for deduplicating the data set according to steps 418 et seq., e.g. steps 318 et seq., as discussed above, which in one embodiment detect anchors or other locations of interest within the second and fifth segments.

Figure 5:
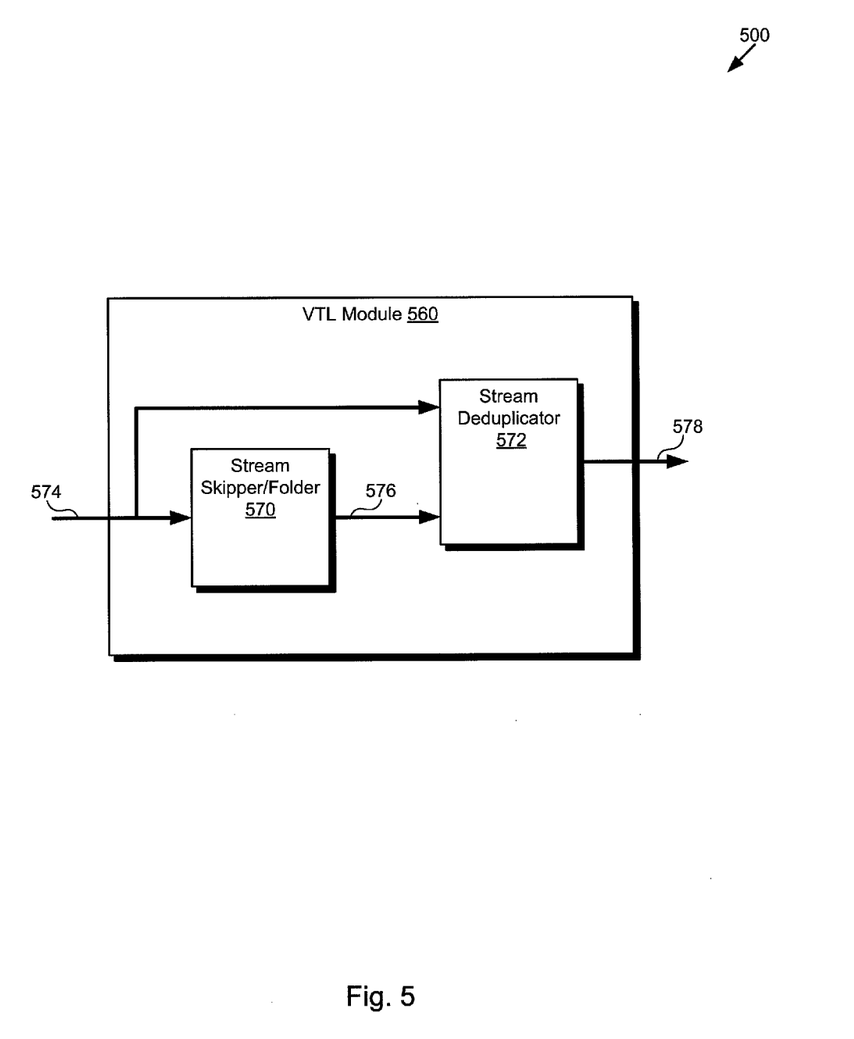
FIG. 5 is a block diagram illustrating an example of a system for performing data deduplication with data segment skipping and folding.

FIG. 5 is a block diagram of VTL module 560 showing illustrative internal detail of VTL module 560 according to one embodiment of the present invention. VTL module 560 represents, in one embodiment of the present invention, VTL module 260 depicted in FIG. 2. VTL module 560 can be implemented as, for example, software, including a computer-readable medium having program instructions executing on a computer, or special-purpose hardware, or firmware, or a combination thereof. VTL module 560 implements the data deduplication technique, including data segment skipping and folding, of the technique introduced here. Further, VTL module 560 implements a technique to enable anchor detection.

VTL module 560 is configured to receive input data stream 574. Input data stream 574 is, for example, an input data stream to be backed up to disks 130 by VTL system 200, received from storage system 125 by way of network adapter 226. Input data stream 574 is received by stream skipper/folder 570 and by stream deduplicator 572 within VTL module 560.

Stream skipper/folder 570 is configured to receive input data stream 574 and to output folded stream 576 according to the technique introduced here. Stream skipper/folder 570 excludes a first segment of data in input data stream 574 from folded stream 576. To perform this exclusion, stream skipper/folder 570 can rely on techniques according to embodiments of the invention as described above with respect to process 300 or process 400. Further, stream skipper/folder 570 converts a second segment of data in input data stream 574 into a segment having a reduced length before inclusion in folded stream 576. To perform this conversion, stream skipper/folder 570 can rely on techniques according to embodiments of the invention as described above with respect to process 300 or process 400.

Stream deduplicator 572 is configured to receive input data stream 574 and folded stream 576, and to detect duplicate data in input data stream 574 by utilizing folded stream 576. Stream deduplicator 572 then outputs deduplicated data stream 578 for storage on, for example, disks 130. Stream deduplicator 572 can detect duplicate data by relying on techniques as described above with respect to process 300 or process 400. For example, stream deduplicator 572 can identify anchors in folded stream 576 by the use of a rolling hash, as discussed above.

Figure 6:
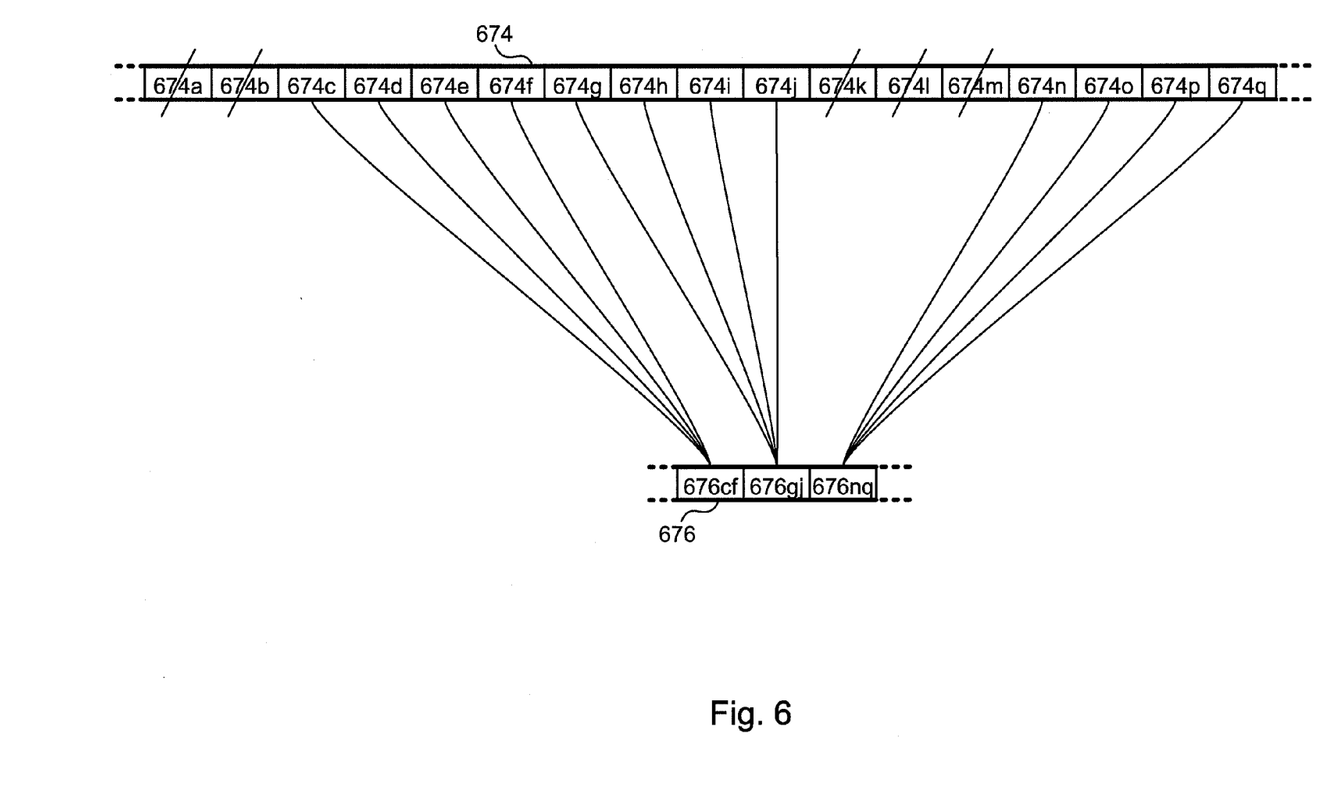
FIG. 6 is a diagram illustrating data streams during data segment skipping and folding.

FIG. 6 is a diagram illustrating data streams during data segment skipping and folding. In particular, FIG. 6 depicts illustrative detail of input data stream 674 and folded stream 676 during skipping and folding by, for example, stream skipper/folder 570, discussed above in relation to FIG. 5. Stream skipper/folder 570 is configured in one embodiment to receive input data stream 674 and to output folded stream 676.

In FIG. 6, input data stream 674 includes 16 data segments represented in FIG. 6 by the letters a through q. Thus, input data stream 674 includes data segment 674a, data segment 674b, data segment 674c, etc. Notably, a given data set can be much longer than the 16 data segments depicted in FIG. 6, and thus input data stream 674 can be understood to also include data segments arriving prior to data segment 674a, and data segments arriving after data segment 674q. For the purpose of illustration, stream skipper/folder 570 is configured to receive data segments in input data stream 674 in the alphabetical order depicted; i.e. in the order from right to left as depicted in FIG. 6.

During data segment skipping and folding of input data stream 674, stream skipper/folder 570 excludes data segment 674a and data segment 674b from folded stream 676, as illustrated by a strikethrough of those data segments in FIG. 6. To perform this exclusion, stream skipper/folder 570 can rely on techniques according to embodiments of the invention as described above with respect to process 300 or process 400.

Further, during data segment skipping and folding of input data stream 674, stream skipper/folder 570 converts data segment 674c through data segment 674f of input data stream 674 into data segment 676cf, which has a reduced length, in folded stream 676. This is illustrated in FIG. 6 by lines connecting each of those segments in input data stream 674 to the folded segment in folded stream 676. To perform this conversion, stream skipper/folder 570 can rely on techniques according to embodiments of the invention as described above with respect to process 300 or process 400.

Further, during data segment skipping and folding of input data stream 674, stream skipper/folder 570 converts data segment 674g through data segment 674j into data segment 676gj, which has a reduced length, in folded stream 676. Notably, stream skipper/folder 570 did not exclude a data segment after the conversion of data segment 674c through data segment 674f. Instead, stream skipper/folder 570 converted two adjacent groups of four segments into corresponding folded segments having reduced length. The omission of this exclusion occurs according to techniques as described above with respect to process 300 or process 400. Adjacent data segments, as indicated herein, refers to data segments of a data set that are located next to each other within the data set.

Finally, during data segment skipping and folding of input data stream 674, stream skipper/folder 570 excludes data segment 674k through data segment 674m from folded stream 676, and converts data segment 674n through data segment 674q into data segment 676nq in folded stream 676.

Thus, after data segment skipping and folding of input data stream 674, stream skipper/folder 570 outputs folded stream 676. As discussed above in relation to FIG. 5, in one embodiment folded stream 676 can be utilized by stream deduplicator 572 to detect duplicate data in input data stream 674. Stream deduplicator 572 can detect duplicate data by relying on techniques as described above with respect to process 300 or process 400. For example, stream deduplicator 572 can identify anchors in folded stream 676 by the use of a rolling hash, as discussed above.

While this description has been written in terms of storage deduplication, the principles of the technique introduced here can be utilized to provide deduplication in other ways, for example over communication links. In such alternate embodiments, a sending system can perform the above described deduplication technique to minimize the amount of bandwidth utilized in transmitting data. The sending and destination systems can work together to ensure that synchronized pattern and anchor databases are shared.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Furthermore, it should be noted that while this description has been written in terms of a VTL system, the teachings of the technique introduced here are not so limited. The technique introduced here can be utilized in any computer environment using any data store, including, e.g., a file system. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for detecting duplicate data in a data set at a storage server, the method comprising:
   identifying a first segment in a data set;
   performing a logical operation on the first segment to convert the first segment into a second segment having a length shorter than the first segment;
   selecting a number in a range of zero to a specified value inclusive;
   identifying, if the number is greater than zero, a third segment in the data set adjacent to the first segment, and a fourth segment in the data set adjacent to the third segment, wherein the third segment has a length equal to the number;
   identifying, if the number is zero, a given segment in the data set adjacent to the first segment as the fourth segment;
   performing a logical operation on the fourth segment to convert the fourth segment into a fifth segment having a length shorter than the fourth segment; and
   detecting at the storage server duplicate data in the data set by utilizing the second segment and the fifth segment, wherein the detecting the duplicate data, includes:
   identifying an anchor in the second segment and the fifth segment; and
   mapping the anchor into the data set.

2. The method of claim 1, wherein the number is selected between zero and the specified value randomly.

3. The method of claim 1, wherein the number is selected between zero and the specified value nonrandomly.

4. The method of claim 1, wherein the specified value is less than a length of the first segment.

5. The method of claim 1, wherein the logical operation is configured to convert the first segment into the second segment by combining a plurality of subsegments of the first segment.

6. The method of claim 1, wherein the logical operation is configured to convert the first segment into the second segment by removing a subsegment from the first segment.

7. The method of claim 1, wherein the logical operation includes a lossless logical operation.

8. The method of claim 1, wherein the logical operation includes a lossy logical operation.

9. A system for detecting duplicate data in an input data stream, the system comprising:
   a processor;
   a stream folder, operatively coupled to the processor, configured to receive an input data stream and to output a folded stream, wherein a first segment of the input data stream is excluded from the folded stream, and wherein a second segment of the input data stream is converted by a logical operation to reduce a length of the second segment before inclusion in the folded stream; and
   a stream duplicate detector, operatively coupled to the processor, configured to receive the folded stream and the input data stream, wherein the stream duplicate detector detects duplicate data in the input data stream by utilizing the folded stream, wherein the stream duplicate detector detects duplicate data by identifying an anchor in the folded stream and mapping the anchor into the input data stream.

10. The system of claim 9, wherein a length of the first segment is selected randomly.

11. The system of claim 9, wherein a length of the first segment is selected non randomly.

12. The system of claim 9, wherein a length of the first segment is shorter than a length of the second segment prior to conversion of the second segment.

13. The system of claim 9, wherein the logical operation is configured to combine a plurality of subsegments of the second segment.

14. The system of claim 9, wherein the logical operation is configured to remove a subsegment from the second segment.

15. The system of claim 9, wherein the logical operation includes a lossless logical operation.

16. The system of claim 9, wherein the logical operation includes a lossy logical operation.

17. A storage server comprising:
   a network adaptor through which to communicate over a network;
   a storage adaptor through which to access a mass storage facility;
   a processor; and
   a memory storing instructions which, upon execution by the processor, cause the storage server to:
   identify a plurality of segments in an input data set received via the network adaptor;
   generate from the input data set an output data set that includes at least one but not all of the plurality of segments in the input data set;
   process the output data set with a logical operator to reduce a length of each segment in the output data set;
   remove duplicate data from the input data set by utilizing the output data set, wherein the duplicate data is removed from the input data set by identifying an anchor in the output data set and mapping the anchor into the input data set; and
   store the input data set on the mass storage facility via the storage adaptor.

18. The storage server of claim 17, wherein generating the output data set includes randomly identifying a segment in the input data set for exclusion from the output data set.

19. The storage server of claim 18, wherein a length of the segment randomly identified is shorter than any one of a lengths of the plurality of segments in the input data set.

20. The storage server of claim 17, wherein generating the output data set includes nonrandomly identifying a segment in the input data set for exclusion from the output data set.

21. The storage server of claim 20, wherein a length of the segment nonrandomly identified is shorter than any one of a lengths of the plurality of segments in the input data set.

22. The storage server of claim 17, wherein the logical operator is configured to combine a plurality of subsegments of a segment.

23. The storage server of claim 17, wherein the logical operator is configured to remove a subsegment from a segment.

24. The storage server of claim 17, wherein the logical operator includes a lossless logical operator.

25. The storage server of claim 17, wherein the logical operator includes a lossy logical operator.

26. A method for detecting duplicate data in a data set at a storage server, the method comprising:
- partitioning a data set into a plurality of segments;
- performing a logical operation on at least one, but not all, of the plurality of segments to shorten a length of the at least one of the plurality of segments prior to detecting duplicate data in the data set; and
- detecting at the storage server duplicate data in the data set by utilizing the at least one of the plurality of segments, wherein the detecting the duplicate data includes:
- identifying anchors in the at least one of the plurality of segments; and
- mapping the anchors into the data set.

27. The method of claim 26, further comprising identifying the at least one of the plurality of segments by randomly identifying a segment in the plurality of segments for exclusion from the logical operation.

28. The method of claim 27, wherein a length of the segment randomly identified is shorter than any one of a lengths of the at least one of the plurality of segments prior to performing the logical operation.

29. The method of claim 26, further comprising identifying the at least one of the plurality of segments by nonrandomly identifying a segment in the plurality of segments for exclusion from the logical operation.

30. The method of claim 29, wherein a length of the segment nonrandomly identified is shorter than any one of a lengths of the at least one of the plurality of segments prior to performing the logical operation.

31. The method of claim 26, wherein the logical operation is configured to combine a plurality of subsegments of a segment being operated upon.

32. The method of claim 26, wherein the logical operation is configured to remove a subsegment of a segment being operated upon.

33. The method of claim 26, wherein the logical operation includes a lossless logical operation.

34. The method of claim 26, wherein the logical operation includes a lossy logical operation.

35. A method of detecting duplicate data in an input data set, the method comprising:
- identifying a plurality of segments in an input data set;
- generating from the input data set an output data set that includes at least one but not all of the plurality of segments in the input data set;
- processing the output data set with a logical operator to reduce a length of each segment in the output data set; and
- detecting duplicate data in the input data set by utilizing the output data set, wherein detecting the duplicate data includes:
- identifying an anchor in the output data set; and
- mapping the anchor into the input data set.

36. The method of claim 35, wherein the generating the output data set includes randomly identifying a segment in the input data set for exclusion from the output data set.

37. The method of claim 36, wherein a length of the segment randomly identified is shorter than any one of a lengths of the plurality of segments in the input data set.

38. The method of claim 35, wherein the generating the output data set includes nonrandomly identifying a segment in the input data set for exclusion from the output data set.

39. The method of claim 38, wherein a length of the segment nonrandomly identified is shorter than any one of a lengths of the plurality of segments in the input data set.

40. The method of claim 35, wherein the logical operator is configured to combine a plurality of subsegments of a segment.

41. The method of claim 35, wherein the logical operator is configured to remove a subsegment from a segment.

42. The method of claim 35, wherein the logical operator includes a lossless logical operator.

43. The method of claim 35, wherein the logical operator includes a lossy logical operator.

44. A system for detecting duplicate data in an input data set, the system comprising:
- a processor;
- means for identifying, operatively coupled to the processor, a plurality of segments in an input data set;
- means for generating, operatively coupled to the processor, from the input data set an output data set that includes at least one but not all of the plurality of segments in the input data set;
- means for processing, operatively coupled to the processor, the output data set with a logical operator to reduce a length of each segment in the output data set; and
- means for detecting, operatively coupled to the processor, duplicate data in the input data set by utilizing the output data set, wherein the means for detecting the duplicate data include:
- means for identifying, operatively coupled to the processor, an anchor in the output data set; and
- means for mapping, operatively coupled to the processor, the anchor into the input data set.

45. The system of claim 44, wherein the means for generating the output data set includes a means for randomly identifying a segment in the input data set for exclusion from the output data set.

46. The system of claim 45, wherein a length of the segment randomly identified is shorter than any one of a lengths of the plurality of segments in the input data set.

47. The system of claim 44, wherein the means for generating the output data set includes a means for nonrandomly identifying a segment in the input data set for exclusion from the output data set.

48. The system of claim 47, wherein a length of the segment nonrandomly identified is shorter than any one of a lengths of the plurality of segments in the input data set.

49. The system of claim 44, wherein the logical operator is configured to combine a plurality of subsegments of each segment in the output data set.

50. The system of claim 44, wherein the logical operator is configured to remove a subsegment of each segment in the output data set.

51. The system of claim 44, wherein the logical operator includes a lossless logical operator.

52. The system of claim 44, wherein the logical operator includes a lossy logical operator.

* * * * *